(12) United States Patent
Cheng et al.

(10) Patent No.: US 12,073,413 B2
(45) Date of Patent: Aug. 27, 2024

(54) PRODUCT EXPERIENCE SERVICE (71) Applicant: Apple Inc., Cupertino, CA (US)

(72) Inventors: Jamie Wang Cheng, Burlingame, CA (US); Christopher Matthew Webb, Santa Clara, CA (US); Trevor Jordan Sheridan, Englewood, CA (US); Ken Tunkhian Loh, Fremont, CA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 15/957,534

(22) Filed: Apr. 19, 2018

(65) Prior Publication Data

US 2019/0325456 A1 Oct. 24, 2019

(51) Int. Cl.
*G06Q 30/016* (2023.01)
*G06Q 20/04* (2012.01)
*G06Q 30/01* (2023.01)
*G06Q 30/02* (2023.01)

(52) U.S. Cl.
CPC ......... *G06Q 30/016* (2013.01); *G06Q 20/047* (2020.05); *G06Q 30/01* (2013.01); *G06Q 30/02* (2013.01)

(58) Field of Classification Search
CPC .................. G06Q 30/016; G06Q 20/0453
USPC .................................................. 705/304
See application file for complete search history.

(56) References Cited

U.S. PATENT DOCUMENTS

| | | | | |
|---|---|---|---|---|
| 6,412,012 B1* | 6/2002 | Bieganski | ............... | G06Q 30/02 709/232 |
| 2010/0174599 A1* | 7/2010 | Rosenblatt | ........... | H04B 5/0031 705/14.37 |
| 2012/0271712 A1* | 10/2012 | Katzin | ............... | G06Q 20/0453 705/14.51 |
| 2013/0059534 A1* | 3/2013 | Sobalvarro | ............. | H04L 67/34 455/41.1 |
| 2014/0006128 A1* | 1/2014 | Grigg | ................. | G06Q 30/0251 705/14.23 |
| 2014/0155047 A1* | 6/2014 | Jackson | ................... | H04W 4/00 455/418 |
| 2015/0112826 A1* | 4/2015 | Crutchfield, Jr. | ... | G06Q 30/0601 705/26.1 |
| 2015/0134429 A1* | 5/2015 | Katakwar | .......... | G06Q 30/0207 705/14.1 |
| 2015/0348163 A1* | 12/2015 | Tamblyn | ............ | G06Q 30/0631 705/26.7 |
| 2015/0379613 A1* | 12/2015 | Hu | ..................... | G06Q 30/0281 705/26.7 |

(Continued)

FOREIGN PATENT DOCUMENTS

EP 3200142 A1 * 8/2017

OTHER PUBLICATIONS

Thompson, "e-Marketing Fundamentals: the Customer Relationship Curve", 2003, www.realmarket.com, (Year: 2003).*

*Primary Examiner* — Sangeeta Bahl
*Assistant Examiner* — Joshua D Schneider
(74) *Attorney, Agent, or Firm* — Polsinelli PC (57) ABSTRACT

The present technology pertains to keeping track of a purchase status of a product and delivering pre-purchase product experiences prior to the purchase of the product and a post-purchase product experience after the purchase of the product. The present technology provides for a device to identify a product and to request a purchase experience that is both informative and useful based on the purchase status of the product.

14 Claims, 6 Drawing Sheets

(56) References Cited

U.S. PATENT DOCUMENTS

| | | | |
|---|---|---|---|
| 2016/0063599 A1* | 3/2016 | Argue | G06Q 30/0631 |
| | | | 705/26.7 |
| 2016/0110722 A1* | 4/2016 | Reddy | G06Q 30/012 |
| | | | 705/302 |
| 2016/0210596 A1* | 7/2016 | Xu | H04L 63/10 |
| 2016/0253746 A1* | 9/2016 | Morrison | G06Q 30/0625 |
| | | | 705/26.62 |
| 2017/0039613 A1* | 2/2017 | Kaehler | G02B 27/0172 |
| 2017/0132841 A1* | 5/2017 | Morrison | G06K 9/00671 |
| 2018/0316656 A1* | 11/2018 | Giglio | G06F 21/6218 |
| 2020/0202390 A1* | 6/2020 | Gregori | G06Q 30/0267 |
| 2020/0242620 A1* | 7/2020 | Keith | G06Q 20/3821 |

* cited by examiner

PRODUCT EXPERIENCE SERVICE

TECHNICAL FIELD

The present technology pertains to providing electronic product experiences and in particular pertains to providing electronic product experiences for a product prior to a purchase and after the purchase.

BACKGROUND

Purchasing products can elicit an emotional response from a purchaser. Whether the product is one that the purchaser has long desired, one that is heavily promoted, one that is a status symbol, one that relates to a hobby or interest of the purchaser, the purchase of some products can be special. In acknowledgement of this special event, there is a need to enhance a purchase experience around some products.

Additionally, in association with the increased prevalence of e-commerce, potential purchasers have grown accustomed to having abundant information regarding a potential product for purchase (e.g., information on different styles, reviews, etc.), but this type of information is inaccessible when a purchaser is visiting a retail store. Any friction in the buying experience could deter a potential sale. Accordingly, there is a need to enhance a purchase experience around products by reducing friction in accessing additional product information.

Furthermore, once home, when the purchaser is unboxing a product, modern consumers may desire instructions in more advanced formats than a difficult to decipher instruction pamphlet. Thus extending the purchase experience beyond an in-store experience can be a differentiator that can drive additional interest in the product.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for providing a digital experience in association with a physical product. The present technology addresses an example technical environment for presenting a digital product experience, and addresses solutions to challenges in delivering the digital product experience. Such challenges include determining an appropriate digital product experience, protecting a customer's privacy while delivering a useful and relevant digital product experience, and providing a good user experience.

First, customers desire to have and store information regarding products they purchase for later reference, but current options require too much effort for too little benefit. For example, a customer could take a picture of product packaging, or could type product information into a note, but this requires effort on behalf of the customer for little gain. What is needed is a mechanism that encourages a customer to engage with a product in a way that a computing device can learn the identity of the product, and where the computing device can seamlessly provide post-purchase information such as warranty information, instructions, registration information, product recall notices, etc.

Second, customers desire to have additional information at their fingertips when making purchasing decisions. While customers can look up this information on the Internet using their mobile devices, this requires too much extra effort on the part of the customer, and therefore many customers forego purchasing decisions while in brick and mortar stores. What is needed is easy to access and easy to view information regarding a product prior to purchase to facilitate in-store purchases.

Third, customers want information about products that are compatible with other products they own. What is needed is easy to access information about whether a product is compatible with a previously purchased product. At the same time, customers want their purchasing decisions to be private.

While the above needs are driven by consumer desires, satisfying these needs presents several technical challenges. For example, to meet one or more of the above needs, a system should be able to easily and accurately identify a product. The system should have reliable information regarding the product. The system should track a purchase status of a product. The system should be able to determine compatible products while maintaining the customer's privacy.

The present technology addresses each of the above problems.

Figure 1:
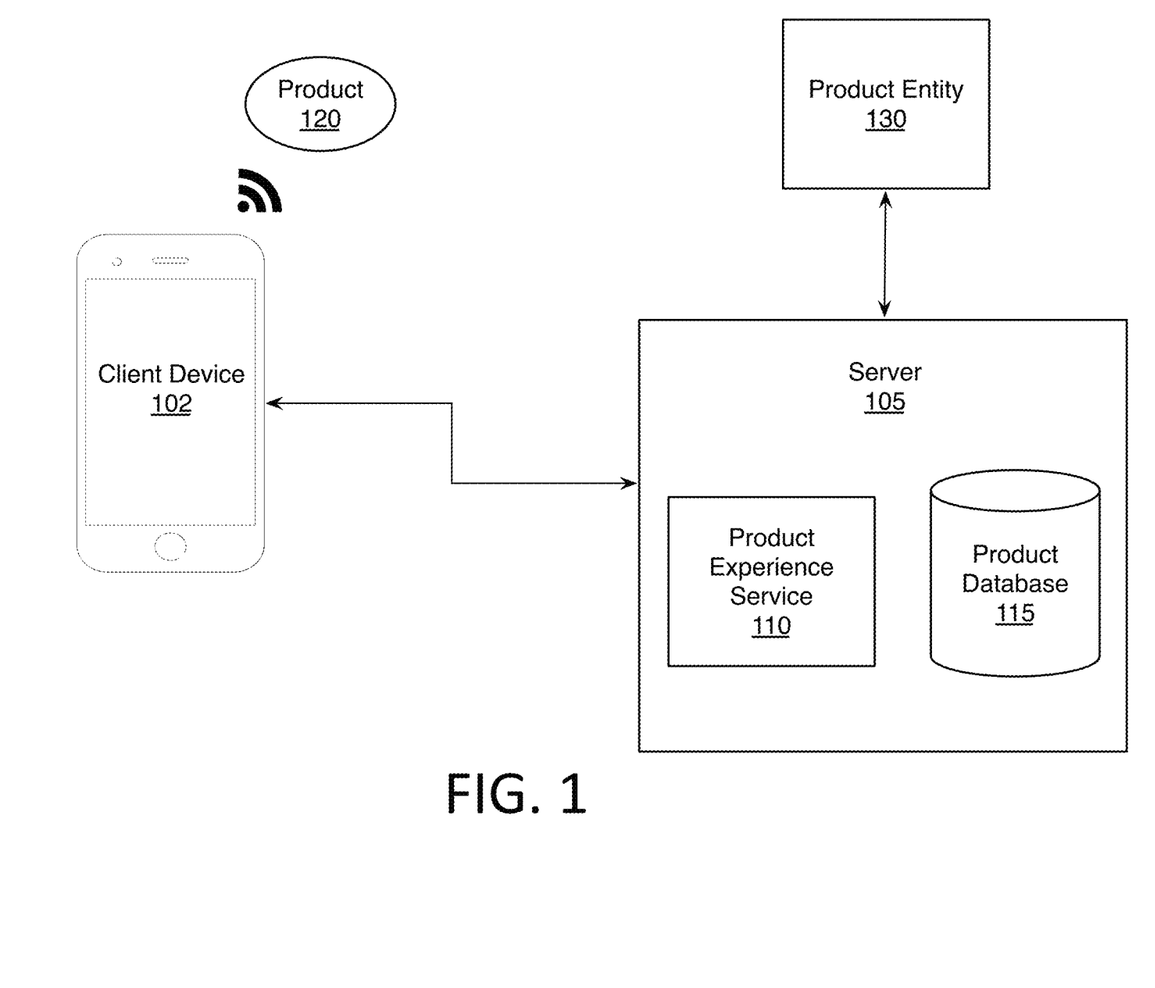
FIG. 1 shows an example of a system including a product experience server and client devices in accordance with some aspects of the present technology.

FIG. 1 illustrates an example system environment in accordance with some aspects of the present technology. FIG. 1 shows client device 102 interacting with server 105, wherein server 105 includes product experience service 110 and product database 115. FIG. 1 will be discussed with reference to the method illustrated FIG. 2 for clarity of explanation, however the system illustrated in FIG. 1 should not be considered limited by the method illustrated in FIG. 2 and the method illustrated in FIG. 2 should not be considered limited by the system illustrated in FIG. 1.

Figure 2:
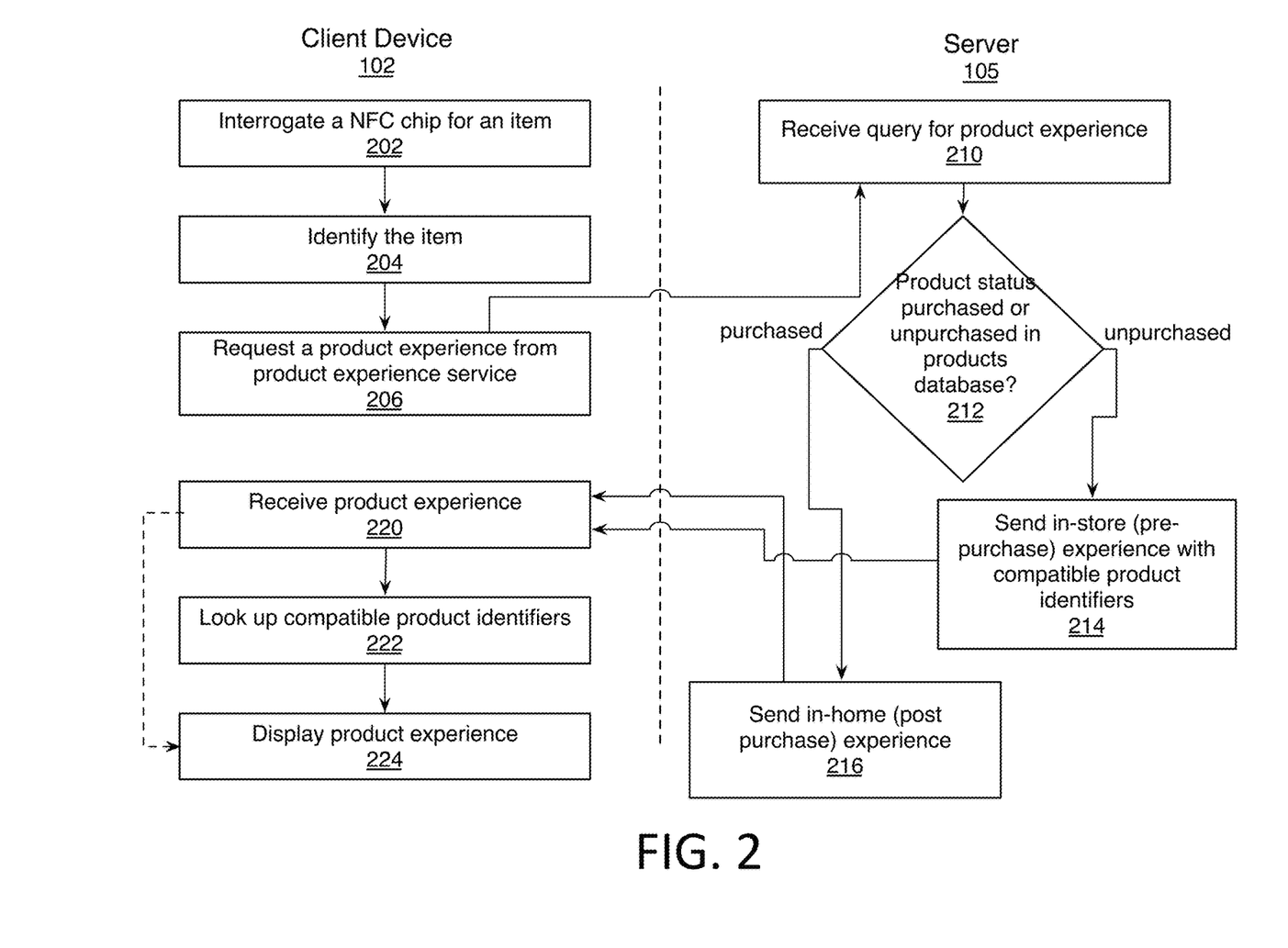
FIG. 2 shows an example method embodiment in accordance with some aspects of the present technology.

Client device 102 may be operated to identify product 120. In some embodiments client device 102 may be operated to interrogate (202) a near field communication (NFC) tag located within the packaging of product 120 to learn product identifying information (204). The NFC tag can be a unique tag included in packing of product 120 by printing the NFC tag onto the packaging or by placing a sticker with the NFC tag on it on the packaging.

The NFC tag can include a variety of information. In some embodiments, the NFC tag can uniquely identify the product type, the specific serial number of the product to identify the specific product, and other product information such as product details, ingredients, etc. In some embodiments, the NFC tag can include limited information, perhaps as little as an identification number that can be used to look up additional information from product experience service 110.

While the present disclosure refers predominantly to an NFC tag, persons of ordinary skill in the art will appreciate similar benefits can be obtained using other technologies to identify the specific product. For example, but not limited to, radio frequency identification (RFID) tags, visual codes such as bar codes and quick response (QR) codes, alphanumeric codes, etc. In some embodiments client device 102 may be operated to take a picture of the packaging of product 120 and to identify the product using machine vision techniques to learn product identifying information (204). In some embodiments, client device 102 may be operated to scan a machine-readable code such as a barcode or a QR code to learn product identifying information (204). Any technology that permits identification of a specific product and communication of the identification to the product experience service 110 may be suitable.

After client device 102 has identified (204) the item, client device can request (206) a product experience from product experience service 110.

In some embodiments product experience service 110 can be an interface to product database 115. Product experience service 110 can be configured to receive requests for product experiences for products identified by client devices such as client device 102. Product experience service 110 can further be configured to interface with product database 115 to receive product experience data or media. Product experience service 110 can further be configured to interact with product database to obtain purchase status for a particular product or product registration information for a particular product.

In some embodiments product database 115 can be multiple databases that may or may not physically reside on the same server as product experience service 110. In some embodiments product database 115 can be a distributed database. In some embodiments, the product database 115 can be in a block chain data model.

Information stored in product database 115 such as product experiences, purchase status, service status, and/or registration information can be provided by product entity 130. Product entity 130 can be a product manufacturer, product retailer, and/or product servicer that has information relevant to product experience data, purchase status, service status, and/or registration information. For example a manufacturer of product 120 can provide one or more items of product experience data for storage in product database 115. A manufacturer of product 120 can also provide information regarding a registration of a product by a purchaser to product database 115. A retailer of product 120 can provide information regarding purchase status and can update product database 115 when a purchase status is changed from unpurchased to purchased. A product servicer can provide information regarding servicing of product 120 for recording in product database 115.

In some embodiments, information regarding the status of a product as unpurchased, purchased, registered, serviced, etc. can additionally or alternatively be recorded into a memory associated with the tag associated with the device. In such embodiments, a retailer point of sale device can be configured to update a product status by communicating with the tag. In some embodiments client device 102 can update the status by communicating with the tag. In such embodiments, client device 102 can learn of the revised status through communication with product experience service 110, which is updated by retailer, product entity 130, or can learn of the revised status through an input received directly from a customer, which is verified through scanning a receipt or communication with product experience service 110, etc.

Recording the status of the product directly into a memory of the tag can speed up an interaction since some product experience information can be received directly from the tag instead of communicating over the Internet to get the data. Recording the status of the product directly into the memory of the tag can also improve the security of the product.

Product entity 130, such as a manufacturer can provide product experience data including data used to populated a product experience interface on client device 102. When product experience service 110 sends a product experience to client device 102, product experience service 110 can send the product experience data, and leave it up to client device 102 to assemble the data into a pre-purchase or post-purchase product experience.

Furthermore, product entity 130 can provide data sufficient to provide multiple pre-purchase or post-purchase product experiences. In one example, product entity 130 can provide data for an initial pre-purchase product experience, and a subsequent pre-purchase product experience wherein the subsequent pre-purchase product experience could include a coupon or other incentive to purchase product 120. In some embodiments, client device 102 can inform product experience service 110 that client device 102 has requested a product experience for product 120 previously and product experience service 110 can serve the appropriate pre-purchase product experience.

In some embodiments, product database 115 does not include personal information identifying a purchaser of a product, and rather product database may only list the status of the product as purchased or registered for warranty, etc., without identifying the purchaser.

Figure 3A:
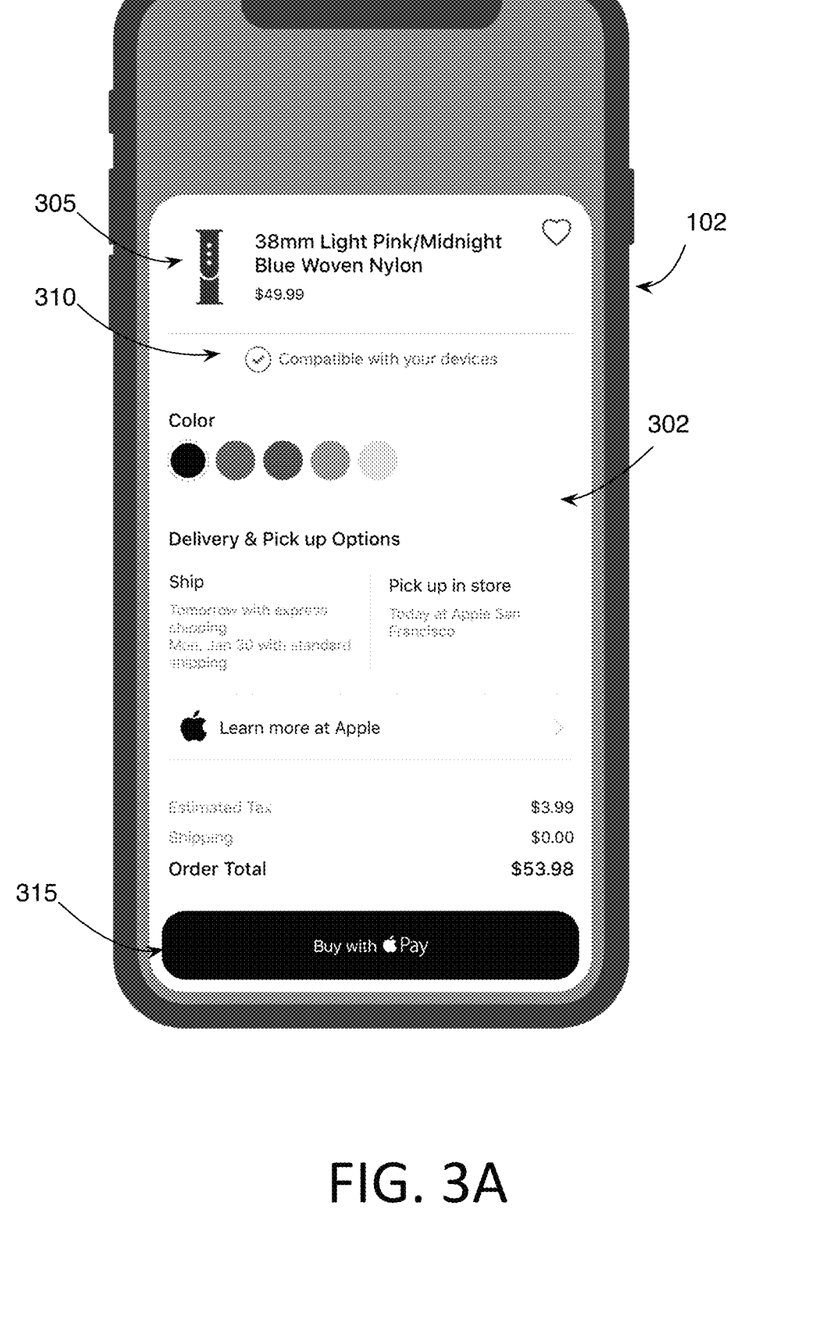
FIG. 3A shows an example pre-purchase product experience in accordance with some aspects of the present technology.
Figure 3B:
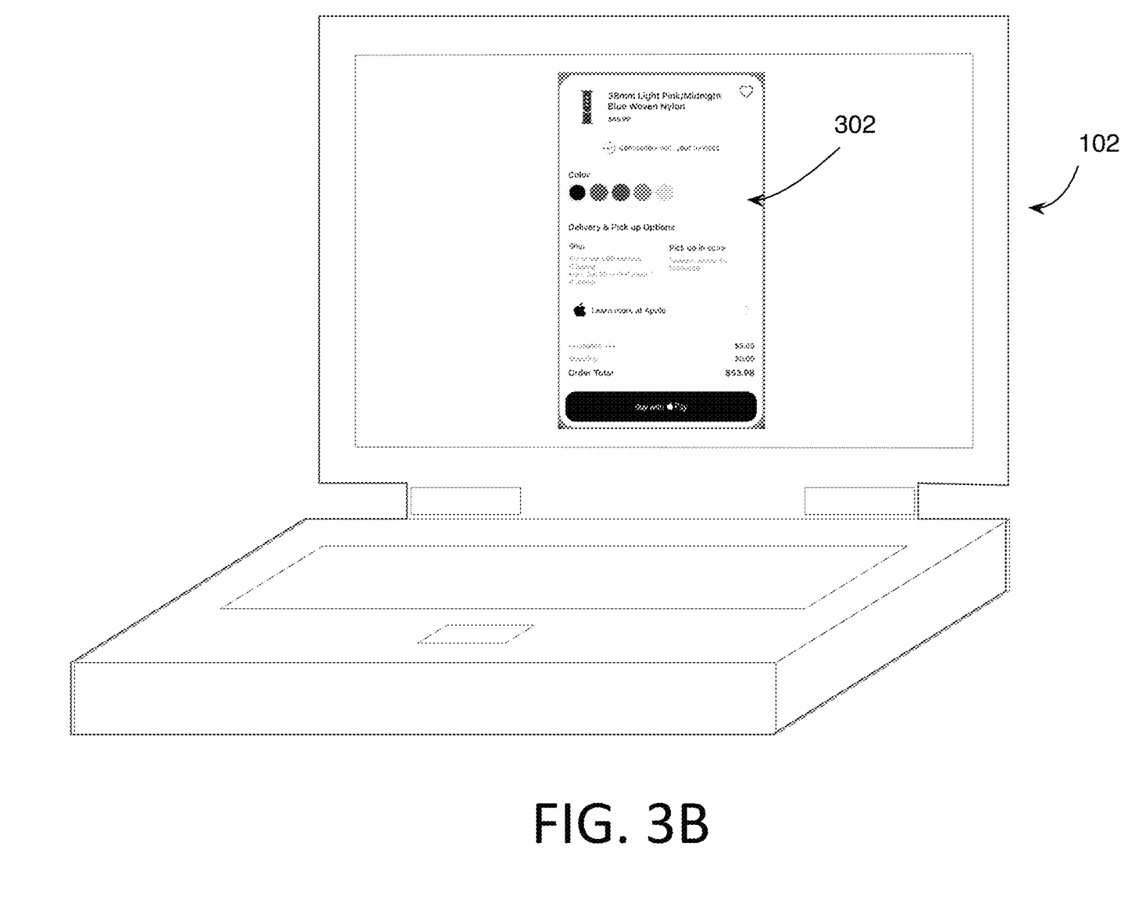
FIG. 3B shows an example pre-purchase product experience in accordance with some aspects of the present technology.
Figure 4:
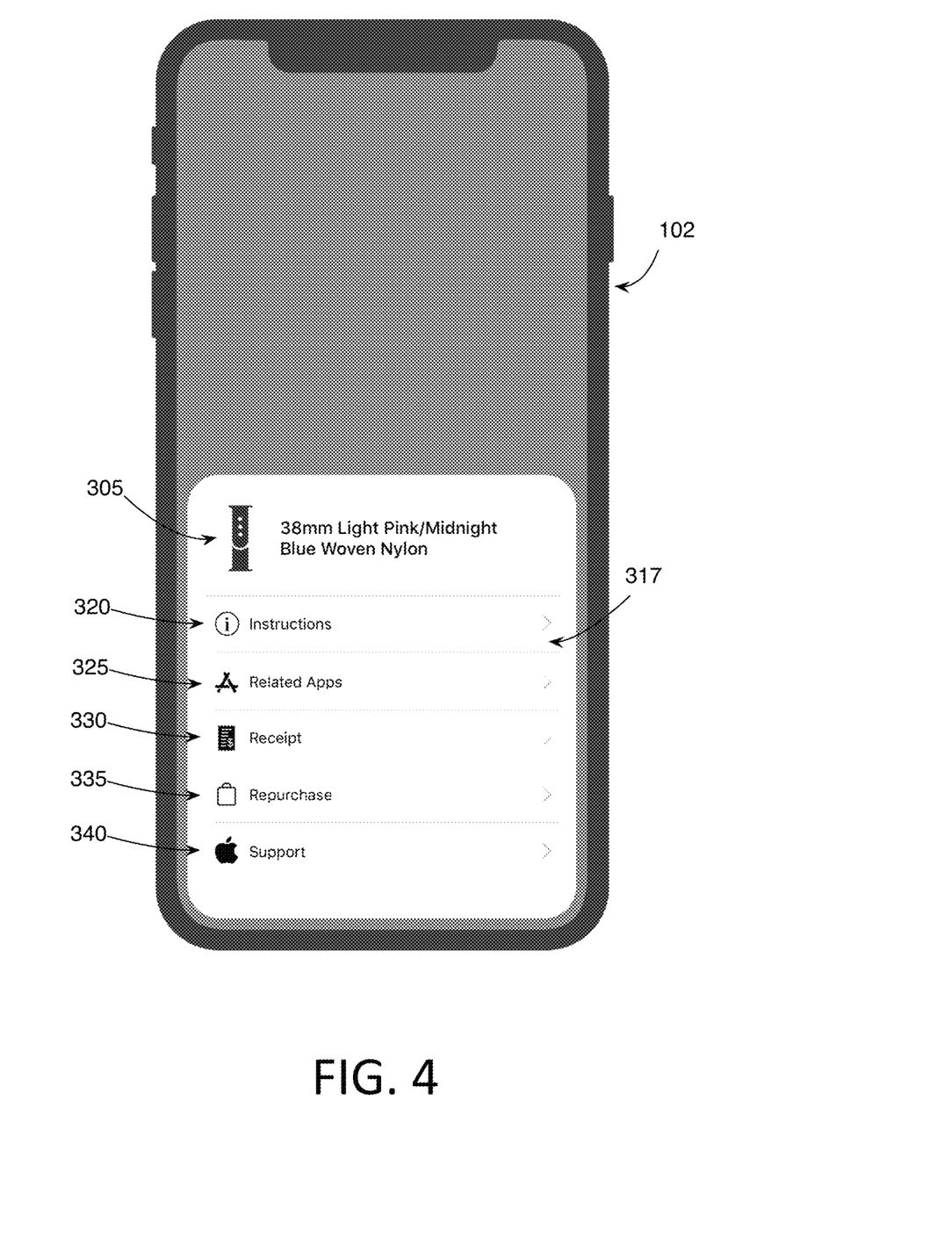
FIG. 4 shows an example post-purchase product experience in accordance with some aspects of the present technology.

FIG. 3A, FIG. 3B, and FIG. 4 show example purchase experiences. FIG. 3A shows example pre-purchase experience 302. Pre-purchase experience 302 can be displayed in association with product 120 (displayed as graphic 305 in pre-purchase experience 302) prior to product 120 being registered as purchased in product database 115. Pre-purchase experience can be an in-store experience displayed when a potential customer has operated client device 102 while in a retail store to identify the item (204). Pre-purchase experience 302 can display information 305 identifying product 120, and as will be addressed in greater detail below, can display with information regarding the compatibility 310 of product 120 with one or more other products. While pre-purchase experience 302 provides purchase interface 315 it is not necessary that product 120 be purchased through pre-purchase experience 302. Benefits of the presently described technology can be achieved whether product 120 is purchased through pre-purchase experience 302 or purchased through a point-of-sale system of product entity 130. For example, product experience service 110 can be informed of the purchase of product 120 either from client device 102 or from a point-of-sale system of product entity 130 and can record the purchase of product 120 in product database 115.

FIG. 3B illustrates pre-purchase experience 302 displayed on a laptop computer. While the present description sometimes illustrates client device 102 as a mobile phone computing device, the present technology applies to any computing device type. While, in some embodiments, client device 102 can identify a product using an NFC interface, which is more commonly associated with a mobile phone, a laptop or desktop can identify the product using an attached NFC reader, or using other means such as a web search, camera, or input from a user of the device. Unless explicitly limited, client device 102 can take any suitable form of computing device.

FIG. 4 illustrates an example post-purchase experience 317. Post-purchase experience 317 can display information 305 identifying product 120 and options pertinent to a purchased product such as option 320 to view instructions, option 325 to view apps related to or that interact with product 120, option 330 to view a receipt for the purchase of product 120, option 335 to repurchase product 120, or option 340 to access support (i.e., chat with a product representative, view replacement parts, view frequently asked questions, etc.) pertaining to product 120.

It should be appreciated that the options displayed in post-purchase experience 317 are not limited to those illustrated in FIG. 4. For example, some other options can include, but are not limited to an option to watch a video pertaining to product 120, to explore product 120 using augmented reality, to register product 305 for its warranty, to bring the product into a virtual reality world.

Returning to FIG. 2, after client device 102 requests (206) a product experience from product experience service 110, product experience service 110 can receive (210) request 206. Product experience service 110 can determine a status of product 120 as purchased or un-purchased by looking up a product identifier in product database 115 or directly from the tag memory.

If a product identifier identifying product 120 indicates that product 120 is un-purchased, product experience service 110 can send (214) a pre-purchase experience. In some embodiments compatible product identifiers can accompany the pre-purchase experience.

In some embodiments client device 102 can receive (220) the pre-purchase experience with compatible product identifiers, and can use the compatible product identifiers to look up (222) the identifiers associated with a user account of the purchaser operating client device 102. In some embodiments, product experience service can query a database on client device 102 to determine if a user account associated with client device has previously purchased any compatible product identifiers. In such embodiments, client device can send any results pertaining to the query to product experience service 110 in an encrypted communication, and the search results are not stored by product experience service 110 to protect the privacy of the user of the user account.

In some embodiments, information pertaining to products purchased in association with a user account is stored locally on client device 102 or other client devices associated with the user account. In some embodiments, information pertaining to products purchased in association with the user account can be encrypted and stored on a server that is accessible by client device 102. In both embodiments, only a client device authorized to access the user account can access information pertaining to products purchased in association with the user account. Information pertaining to products purchased in association with the user account are not available to product experience service 110 in order to protect the privacy of a user associated with the user account. However, it should be appreciated that it may be technically feasible to make products previously purchased in association with the user account available to product experience service 110, and in some embodiments product experience service 110 can query a database storing purchased product information, when permitted by a user of the account, however, any compatible product information should not be stored in product database.

In some embodiments compatible product information includes information about previously purchased products, or sizing information, allergy information, or other personal attributes relevant to a purchase decision of a product.

After client device 102 has looked up (222) the compatible product identifiers, client device 102 can display (224) the received product experience by inserting the appropriate text 310 regarding compatibility of 120 with previous purchases in pre-purchase experience 302.

At a later time, when product experience service 110 determines that product 120 appears in product database 115 having a status of purchased, product experience service 110 can send a post-purchase experience (216) to client device 102 for display (224). Accordingly, the present technology can facilitate presentation of a pre-purchase experience for product 120 prior to a customer's purchase of the product and can later present a post-purchase experience for product 120 after the customer's purchase of the product.

In some embodiments, product experience service 110 can determine whether to serve a pre-purchase product experience or a post-purchase product experience based on a current location of client device 102. In such embodiments, client device 102 can send information regarding the current location of client device 102 along with the request (206) for the product experience. If product experience service 110 can determine that client device 102 is at a location of a retailer of product 120. If it is determined that client device 102 is at the location of a retailer of product 120 a pre-purchase product experience can be sent by product experience service 110. On the other hand, if the location of the client device corresponds to a residential address, product experience service can send a post-purchase product experience. In some embodiments a current location of client device 102 can be determined utilizing Wi-Fi fingerprinting, Bluetooth beacons, trilateration techniques, or geolocation systems.

While product database 115 contains information regarding a product's purchased status as purchased or un-purchased, for privacy reasons, in some embodiments, product database 115 will not contain identifying information regarding the customer or user account that has purchased the product unless the customer has permitted such information to be stored in product database 115.

In some embodiments a product can be returned, and any purchase information or product registration information stored in product database 115 or in memory of a tag associated with the product can be erased and returned to a pre-purchase state.

In some embodiments client device 102 can include a shopping application or mobile wallet application that provides a user interface and functionality for performing operations 202, 204, 206, 220, 222, and 224.

Among the advantages of the present technology addressed herein is the ability to conveniently provide additional features as part of post-purchase experience 317. For example, post-purchase experience 317 can conveniently enable an augmented reality experience 330. Such an experience may make use of features of client devices 102 to view live video of product 120 on a display of client device 102 while instructions or information regarding product 120 are presented on display client device 102 along with a live video of product 120.

In some embodiments augmented reality may also be provided in pre-purchase experience 302. This may be achieved by using client device 102 to capture live video of product 120 and display additional information regarding product 120 on display of client device 102 along with the live video product 120.

Likewise, virtual reality experiences can be triggered. For example, when online shopping, a virtual reality experience can be launched that reproduces an in-store experience or that allows a user to experience what it might be like to own the product. In some embodiments, a post-purchase experience can launch a virtual reality experience appropriate for the product. For example, if the product is an action figure, the post purchase experience could be a VR adventure with the action figure. If the product is a device, the VR experience could be an experience using features of the device.

In some embodiments, whether displayed through augmented reality or directly in pre-purchase experience 302, the customer can be informed of additional information beyond compatibility with previously purchased devices. For example the customer can be informed whether a product is the appropriate size for the customer or if the product contains ingredients to which the customer may be allergic. In such embodiments, this information may be obtained in the same fashion has information regarding previously purchased devices. That is information regarding sizing, allergies, or other potentially personal attributes can be stored in a way such that they are private and only accessible to client device 102 and are not accessible product experience service 110.

In some embodiments when client device 102 receives post-purchase product experience 317, client device 102 can also download a receipt for the purchase of the product and store the receipt on client device 102, or on a server in association with the user account associated with client device 102.

Among the advantages of the present technology addressed herein is the ability to search for previously purchased products even when the product's not currently accessible or has been lost. For example, once client device 102 receives (220) a post-purchase experience 317, client device 102 can automatically (without a user of client device 102 providing an input to client device 102 to take the action) record ownership the product 305 identified in post-purchase experience 317. Accordingly at a later time, a user of client device 102 can access a user interface on client device 102 that provides functionality for searching or browsing purchased products. In some embodiments the interface on client device 102 may provide options for viewing post-purchase experience 317, reporting the product lost, purchasing the product again, transferring ownership of the product, ordering replacement parts, or providing information regarding servicing or warranty information for the product.

Among the advantages of the present technology addressed herein is the ability to identify products in pre-purchase experience 312 as a favorite item or wish list item. A customer may wish to mark an item as a favorite item when they do not intend to purchase product 305, but may desire to purchase product 305 at a later time. In some embodiments items marked as a favorite item may be viewable by family members. In this way favorited items can be used to develop a wish list or a gift registry that family members may access. In some embodiments it may also be possible to send a pre-purchase experience 302 to a friend or family member so that they may buy product 305.

In some embodiments, it may also be possible for client device to request advertising pertinent to a pre-purchase experience or post-purchase experience. This may allow advertisers to offer deals on behalf of product entity 130 or advertisements for competing products to a user of client device 102. In some embodiments, when client device 102 requests advertising pertinent to a product identified in a purchase experience the client device may be configured to identify the product in the purchase experience or may be configured to only identify a category of product. In some embodiments advertising can be triggered, in part, based on location of client device 102. Any advertising should only be offered in accordance with the consent of the customer operating client devices 102 or at least in accordance with and accepted privacy policy.

In some embodiments, client device 102 can identify product 120 in a retailer that is not affiliated with product experience service 110. In such embodiments, the present technology is still operable, and a pre-purchase product experience can be presented as long as the product is known to product experience service 110 from another retailer, however, the pre-purchase product experience will not include an option to purchase the product using computing device 102. Once product 120 has been purchased, a user can operate client device 102 to notify product experience service 110 that the product has been purchased to access a post-purchase product experience.

Figure 5:
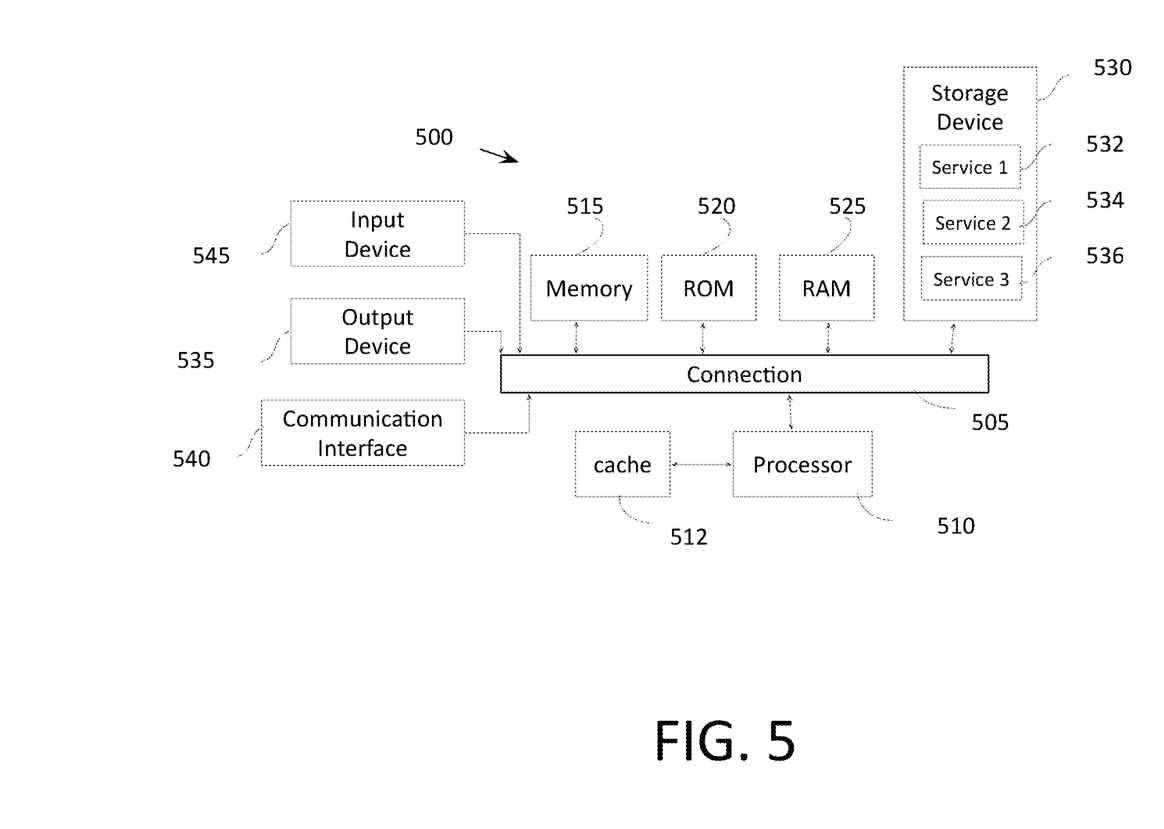
FIG. 5 shows an example of a system for implementing certain aspects of the present technology.

FIG. 5 shows an example of computing system 500, which can be for example any computing device making up client device 102, server 105 or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions for causing a client device to present enhanced product engagement opportunities to a customer while preserving privacy of the customer, the instructions, when executed by the client device, cause the client device to:

request, by the client device, an experience for a product having a unique identifier from a product experience service located at a server, the product experience service being in communication with a product database for tracking a purchase status of the product;

receive, by the client device, a pre-purchase product experience from the product experience service located at the server the product database does not include information regarding a user account, the pre-purchase product experience includes compatible product identifiers;

after receipt of the pre-purchase product experience including the compatible product identifiers, look up, by the client device, the compatible product identifiers in a database associated with the user account to determine if the user has previously purchased a product having one of the compatible product identifiers, wherein the database associated with the user account is different than the product experience service and is only accessible to the user account; and display, by the client device, the pre-purchase product experience with a previously purchased product identified from a lookup of the compatible product identifiers, wherein the previously purchased product is compatible with the product.

2. The non-transitory computer readable medium of claim 1, wherein the instructions cause the client device to:
prior to displaying the pre-purchase product experience, determine if the product is compatible with any products previously purchased by the user account; and
when it is determined that the product is compatible with the previously purchased product, identify the previously purchased product in the pre-purchase product experience.

3. The non-transitory computer readable medium of claim 1, comprising:
retrieving information regarding allergy risks or sizing information for the user account with respect to the product from the database associated with the user account; and
displaying the allergy risks or sizing information with the pre-purchase product experience from the product experience service that does not include user account information.

4. The non-transitory computer readable medium of claim 1, wherein the database associated with the user account is a local storage on the client device.

5. The non-transitory computer readable medium of claim 1, wherein the database associated with the user account is a server accessible by the client device that stores user account information.

6. The non-transitory computer readable medium of claim 1, wherein the product experience service does not associate the unique identifier or record of purchase with user account information.

7. A system comprising:
at least one processor of a client device; and
a computer readable medium storing instructions, the instructions, when executed by the at least one processor, cause the at least one processor to:
request an experience from a product experience service located at a server for a product item by the system operated by a customer associated with a user account;
receive a pre-purchase product experience from the product experience service located at the server, the product experience service being in communication with a product database for tracking a purchase status of the product item, the product database does not include information regarding the user account, the pre-purchase product experience includes compatible product identifiers; and
after receipt of the pre-purchase product experience including the compatible product identifiers, look up the compatible product identifiers in a database associated with the user account to determine if the user account has previously purchased a product having one of the compatible product identifiers, wherein the database associated with the user account is different than the product experience service and is only accessible to the user account; and
display the pre-purchase product experience with a previously purchased product identified from a lookup of the compatible product identifiers, wherein the previously purchased product is compatible with the product.

8. The system of claim 7, wherein the instructions cause the at least one processor to:
after presenting the pre-purchase product experience, send the pre-purchase product experience to a second user account.

9. A method comprising:
request, by a client device, an experience for a product having a unique identifier from a product experience service located at a server, the product experience service being in communication with a product database for tracking a purchase status of the product;
receive, by the client device, a pre-purchase product experience from the product experience service located at the server the product database does not include information regarding a user account, the pre-purchase product experience includes compatible product identifiers;
after receipt of the pre-purchase product experience including the compatible product identifiers, look up, by the client device, the compatible product identifiers in a database associated with the user account to determine if the user account has previously purchased a product having one of the compatible product identifiers, wherein the database associated with the user account is different than the product experience service and is only accessible to the user account; and
display, by the client device, the pre-purchase product experience with a previously purchased product identified from a lookup of the compatible product identifiers, wherein the previously purchased product is compatible with the product.

10. The method of claim 9 comprising:
sending a purchase status update indicating that the product was purchased, wherein the purchase status update does not identify the user account, wherein the product becomes indicated as purchased in the product database.

11. The method of claim 9, further comprising:
sending a second request for a product experience for the product identified in the second request, wherein the second request does not identify the user account.

12. The method of claim 11, wherein the post-purchase product experience provides a user with a virtual reality experience involving the product.

13. The method of claim 11, wherein the product associated with the second request is identified by reading an NFC tag affixed to the product to learn the unique identifier and that the product has been purchased; and
wherein the request for the experience from the product experience service for the product after being identified as part of the second request includes a request for the post-purchase product experience.

14. The method of claim 11, wherein the pre-purchase product experience is sent to the client device when the server determines that there is no record of the previous purchase of the product at the product database.

* * * * *